Feb. 8, 1955    N. A. BARKER    2,701,590
ENGINE MOUNTING AND DIRECT DRIVE FOR
PORTABLE RIM DRIVEN CIRCULAR SAWS
Filed Sept. 16, 1953    3 Sheets-Sheet 1
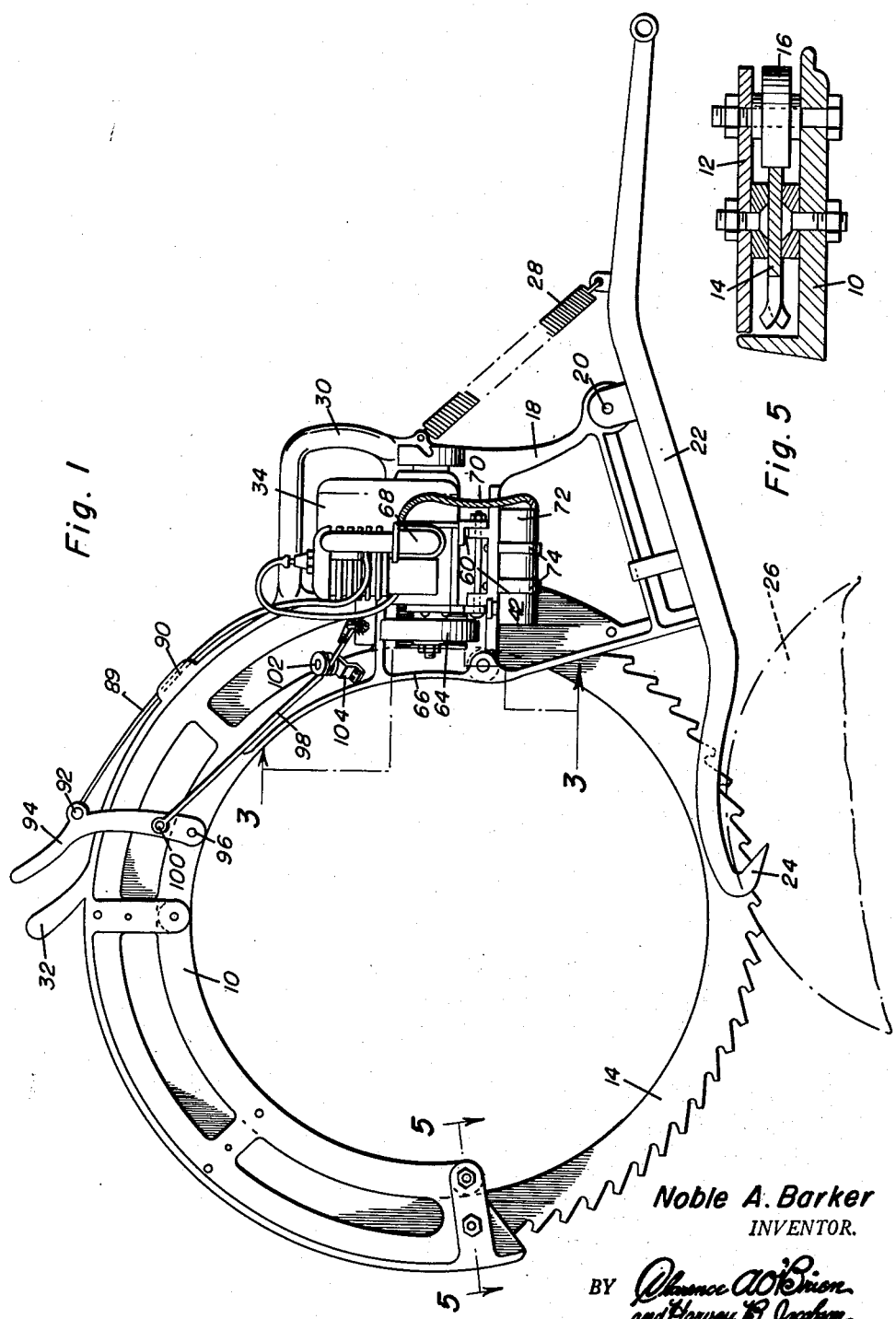
Noble A. Barker
INVENTOR.

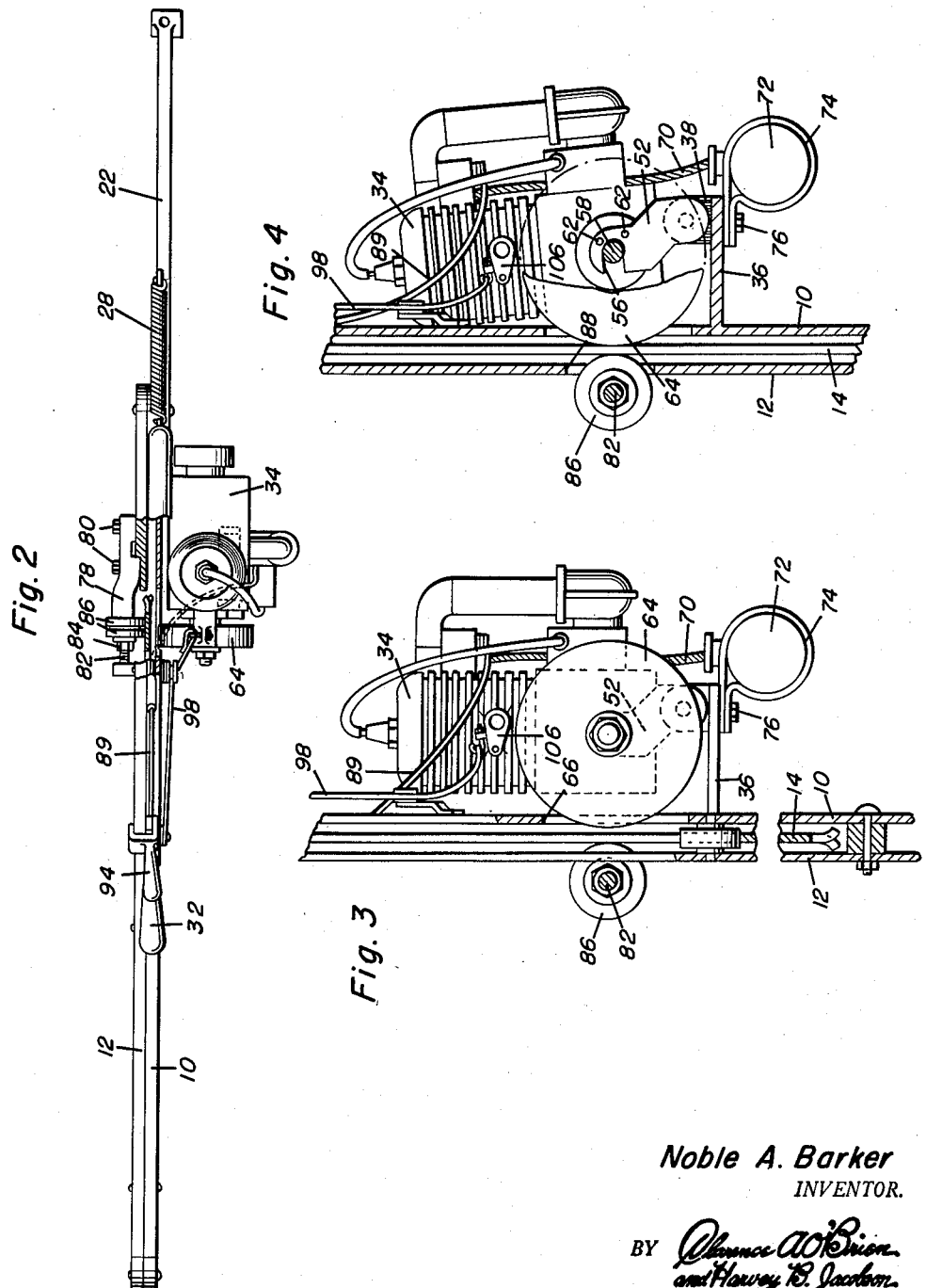

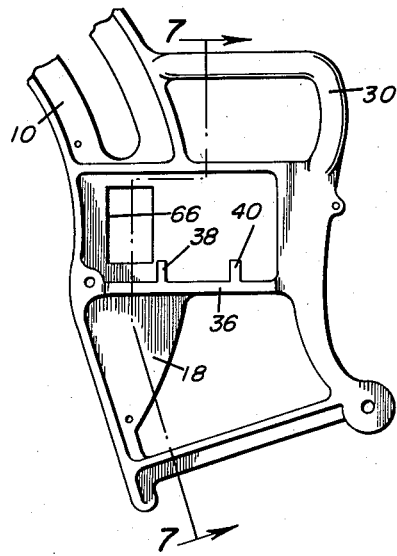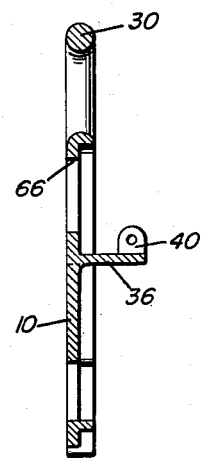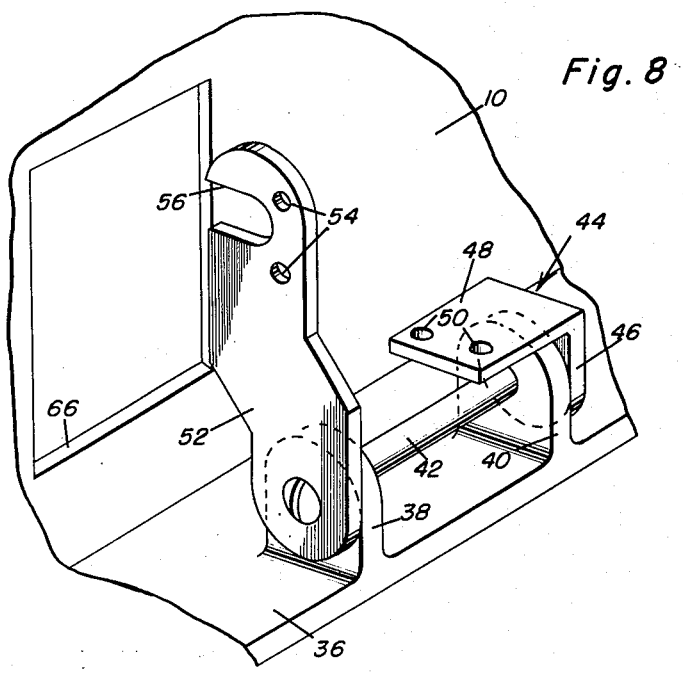

United States Patent Office 2,701,590
Patented Feb. 8, 1955

2,701,590

ENGINE MOUNTING AND DIRECT DRIVE FOR PORTABLE RIM DRIVEN CIRCULAR SAWS

Noble A. Barker, Springfield, Mo., assignor to Barker Saw Company, Springfield, Mo., a corporation of Missouri Application September 16, 1953, Serial No. 380,474

4 Claims. (Cl. 143—44)

This invention comprises novel and useful improvements in an engine mounting and direct drive for circular saws and more specifically pertains to novel and advantageous improvements in a power operated portable circular saw.

The principal objects of this invention are to improve portable power operated circular saw by providing a simplified light-weight construction of the same wherein an internal combustion engine as a power means for the saw may be directly mounted upon the frame of the saw in an improved and simplified manner; and wherein a combined single control means may be provided for controlling the speed of the engine and the driving engagement of the latter with the saw.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of one suitable embodiment of a power operated portable circular saw incorporating therein the principles of this invention, there being indicated therein in dotted lines the manner in which the saw is operatively associated with a log to be cut thereby;

Figure 2 is a top plan view, parts being broken away and shown in horizontal section, of the embodiment of Figure 1;

Figure 3 is a vertical transverse detail view, taken partly in section and partly in elevation upon the plane of the broken section line 3—3 of Figure 1, and showing in particular the manner in which the engine is mounted upon the frame of the saw and is operatively associated with the circular saw blade, the engine being shown in its disengaged position with respect to the saw blade;

Figure 4 is a view similar to Figure 3 but showing the engine operatively engaged in driving relation with the saw blade;

Figure 5 (Sheet 1) is a horizontal sectional detail view taken substantially upon the plane indicated by the section line 5—5 of Figure 1 and showing certain details of the supporting framework of the saw, and means whereby the annular saw blade is rotatably mounted upon the framework;

Figure 6 is a fragmentary side elevational view of a portion of the saw framework including a handle whereby the saw may be carried and manipulated, and showing a shelf on the framework upon which the engine is pivotally mounted, the engine being removed therefrom;

Figure 7 is a vertical transverse sectional detail view taken substantially upon the plane indicated by the broken section line 7—7 of Figure 6; and Figure 8 is a fragmentary perspective view of a portion of the supporting frame of the saw and showing the bracket means whereby the engine is pivotally mounted upon the supporting framework, the engine being removed therefrom.

Disclosed in Figure 1 of the drawings is a portable power operated saw of a type disclosed and claimed in the prior patents of Albert P. Smith, Patent Nos. 2,572,065; 2,590,898; 2,599,495; 2,635,750, and to which type of saw the principles of the present invention are applied.

In the portable saw constructions of the above mentioned patents, an annular or circular saw blade is rotatably mounted upon the supporting framework and within an enclosing guard for the blade and is driven by a friction wheel connected by a flexible cable to a remotely located source of power such as an internal combustion engine or the like. The present improvement as disclosed in this application relates to an improved means whereby an internal combustion engine comprising a source of power for driving the saw through a friction drive roller may be mounted upon the frame of the saw in an improved manner; and may be pivotally adjusted towards and from the saw blade to place the drive roller in operative engagement with the saw blade and to withdraw the roller therefrom and thereby control the application of power to the saw blade, together with certain improvements in the manner of applying the power of the engine driven friction roller to the saw blade and for controlling the operation of the engine.

In the accompanying drawings, it will be seen that the supporting frame of the saw is indicated generally by the numeral 10, this frame being provided with an arcuate shield or guard plate 12, the annular or circular blade 14 being rotatably mounted upon the supporting frame and between the same and the guard by means of supporting rollers 16 (Figure 5). Pivoted to an extending lug 18 of the frame, as by means of a pivot pin 20, is a lever 22 having an anchor or hook 24 whereby the same may be engaged with a log or the like, indicated in dotted lines at 26 in Figure 1, to thereby assist in positioning the saw for cutting logs or similar material. A tension spring 28 is secured to the lever 22 and to a portion of the supporting frame, as for example, a part of a handle member 30 to yieldingly urge the hook 24 of the lever into engagement with the log. The saw frame is provided with a further handle or hand-grip 32 and the handle members 30 and 32 assist in positioning and steadying the saw during its use and in carrying the same. The above described construction has been generally set forth and claimed in the above mentioned patents of Albert P. Smith.

In the present invention there is disclosed an internal combustion engine indicated generally by the numeral 34, which engine itself may be of any known and conventional design, and which is of sufficient power to efficiently operate the circular saw blade 14.

Provision is made for pivotally and movably supporting this engine upon a portion of the supporting framework of the saw whereby the engine may be pivoted towards and from the annular saw blade 14, upon one side thereof, in a manner to be now described.

Extending laterally from the outer side of the supporting frame 10 adjacent the handle 30 is a substantially horizontally disposed shelf 36 (Figures 3 and 4). As shown more clearly in Figures 6–8, the shelf 38 is provided with a pair of parallel upstanding lugs 38 and 40 which are apertured to receive a pivot pin or axle 42 therein. At one end of this axle is provided an angle iron bracket member 44 having a vertical leg 46 which is pivoted upon the pin 42 and having a horizontal leg 48 provided with a pair of apertures 50. At its other end the pin 42 has a plate-like bracket member 52 having an apertured lower end which may be either pivotally or fixedly secured to and carried by the pivot pin 42, and an upper end provided with a pair of apertures 54 and with a laterally extending slot 56.

The members 44 and 52 constitute a bracket whereby the engine 34 may be pivotally carried by the shelf 36 of the supporting frame 10. For that purpose suitable bolts extend through the apertures 50 and 54 and engage corresponding openings in the crankcase or framework of the engine 34. It will be appreciated that the bolt openings 50 and 54 are appropriately positioned to engage existing bolts or bolt holes in the crankcase and crankcase end plate respectively of the internal combustion engine 34. The slot 56 is adapted to be disposed at the power take-off end of the engine, as will be best apparent from Figure 4, with the slot 56 straddling the forward end of the crankshaft of the engine, which crankshaft is indicated in Figure 4 by the numeral 58.

The bolts for detachably securing the member 44 to the lower side of the engine crankcase are shown at 60 (Figure 1), while the bolts for securing the bracket member 52 by its apertures 54 to the front end wall of the engine are shown at 62 (Figure 4).

It will be apparent that by this construction the engine 34 is mounted upon the supporting framework at one side of the saw blade, and is pivotally movable towards and from the saw blade.

The forward end of the crankshaft 58 of the engine has a friction roller 64 of any suitable construction secured thereto, and this roller is adapted to be movable through an opening 66 formed in the frame support 10 whereby the roller may be moved into and out of engagement with one side of the saw blade.

The engine is preferably provided with the usual carburetor or other device for supplying a combustible fuel to the same, this carburetor being indicated by the numeral 68 (Figure 1) and being disposed upon that side of the engine which is remote from the supporting frame 10. A flexible tube or conduit 70 connects this carburetor with a gasoline tank 72 which tank is secured to the underside of the shelf 36 as by a clamping or supporting band or bracket 74 by means of fastening bolts 76. It will thus be apparent that the gasoline tank is supported in stationary position upon the supporting frame 10 of the saw and at the remote end of the shelf from the saw, and is connected by a flexible conduit to the pivotally mounted engine.

Since when the friction driving roller 64 is placed into operative engagement with the side of the circular saw blade 14 by being positioned through the slot 66 in the supporting frame, it exerts a side thrust against the saw blade, a brace means or abutment member is provided for resisting this thrust and maintaining the saw blade against distortion. For this purpose there is provided, as shown best in Figure 2, an abutment bracket 78 which is secured to either the supporting frame 10 or the shield or guard plate 12 thereon as by means of fastening bolts 80. Extending from this bracket is an axle 82, adjustable axially toward or from the bracket 78 by means of an adjusting nut 84, and which axle is provided at its outer end with a pressure roller 86. This pressure roller extends through a slot or opening 88 which is formed in the cover plate 12 whereby the roller extends through this opening and engages the opposite side of the saw blade from that engaged by the friction drive roller 64. Thus, when the drive roller is pressed against the saw blade in the manner shown in Figure 4, by means of tilting the engine and its mounting bracket members towards the saw blade, the saw blade will be clamped between the brace roller 86 and the driving roller 64 whereby the latter will frictionally rotate and drive the saw blade. When the engine is tilted away from the saw blade as in Figure 3, the friction roller is out of contact with the saw blade and the driving engagement is thus broken. By this construction the roller 86 serves to guide and brace the saw blade against deflection during the driving of the same; and also constitutes a guide roller for the saw blade at all times.

The internal combustion engine is provided with any conventional form of speed control means whereby the speed and power of the engine may be regulated. For that purpose the usual carburetor throttle valve (not shown) may be provided which is adapted to be actuated by a control cable or rod 89. This control member 89 extends through suitable guide members 90 mounted upon the frame 10 and is connected as by a pivot pin 92 with a control lever 94 whose extremity is pivoted as at 96 to the supporting frame. The lever is positioned adjacent the hand member 32 whereby the operator in gripping the hand member 32 will also be enabled to manipulate the control lever 94. By this means the speed of the engine may be readily adjusted by controlling its fuel supply in accordance with the conventional manner, and this adjustment may be effected regardless of the pivotal position of the engine.

In order to control the pivotal position of the engine there is provided a further rod or cable 98 which is connected as by a pin 100 to the lever 94 at one extremity of the cable, is entrained about a guide roller or the like 102 mounted upon a suitable bracket 104 upon the frame member, and at its extremity is secured to a bracket or lug 106 upon the engine 34. It will thus be apparent that when the cable 98 is manipulated by the lever 94 the engine will be pivoted towards or from the saw blade.

The lever 94 thus comprises a common control for moving the engine and its driving roller into or out of operative engagement with the saw blade; and for simultaneously controlling the speed of the engine and its power. It is preferred to so adjust the control linkages whereby the engine throttle valve and the pivoting movement of the engine are manipulated that the engine will be speeded up as the driving roller is placed in driving engagement with the saw blade; and will be slowed down to idling speed as the engine is moved out of engagement with the saw blade.

It is of course comprehended by the present invention that the engine speed control linkage and the engine positioning linkage may be independently adjusted to obtain the desired synchronized action of these members by the single manual control lever 94.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A portable power operated saw including a supporting frame, a rim-driven rotatable saw blade movably mounted upon said frame, an engine having a saw blade driving means, means pivotally mounting said engine upon said frame for movement of said saw blade driving means into and out of driving engagement with the side of said saw blade, means for controlling the speed of said engine, a common actuating means connected to said mounting means and said controlling means for simultaneously increasing the speed of the engine when the driving means is moved into driving engagement with the saw blade.

2. A portable power operated saw including a supporting frame, a rim-driven rotatable saw blade movably mounted upon said frame, an engine having a saw blade driving means, means pivotally mounting said engine upon said frame for movement of said saw blade driving means into and out of driving engagement with the side of said saw blade, means for controlling the speed of said engine, a common actuating means connected to said mounting means and said controlling means for simultaneously increasing the speed of the engine when the driving means is moved into driving engagement with the saw blade and idling the engine when the driving means is disengaged from the saw blade.

3. The combination of claim 1 wherein said common actuating means includes a manually operable member mounted on said frame and having a pair of connecting means respectively connected to the engine controlling means and the mounting means.

4. The combination of claim 1 wherein said common actuating means includes a manually operable member mounted on said frame and having a pair of connecting means respectively connected to the engine controlling means and the mounting means, and a spring operatively connected to the frame and the engine mounting for yieldingly urging the saw blade driving means out of contact with the saw blade.

References Cited in the file of this patent

UNITED STATES PATENTS

| Number | Name | Date |
| --- | --- | --- |
| 800,334 | Stevens | Sept. 26, 1905 |
| 1,246,823 | Shelton | Nov. 13, 1917 |
| 1,395,100 | Fite | Oct. 25, 1921 |
| 1,395,101 | Fite | Oct. 25, 1921 |
| 2,572,065 | Smith | Oct. 23, 1951 |
| 2,590,898 | Smith | Apr. 1, 1952 |
| 2,599,495 | Smith | June 3, 1952 |
| 2,635,750 | Smith | Apr. 21, 1953 |

FOREIGN PATENTS

| Number | Country | Date |
| --- | --- | --- |
| 532,387 | France | Mar. 14, 1921 |
| 70,233 | Sweden | Sept. 16, 1930 |